United States Patent
Conde (10) Patent No.: US 9,532,551 B1
(45) Date of Patent: Jan. 3, 2017

(54) PET TOY WITH HIDDEN TREAT CAVITY

(71) Applicant: Michael Conde, Shepherdsville, KY (US)

(72) Inventor: Michael Conde, Shepherdsville, KY (US)

(*) Notice: Subject to any disclaimer, the term of this patent is extended or adjusted under 35 U.S.C. 154(b) by 0 days.

(21) Appl. No.: 15/063,421

(22) Filed: Mar. 7, 2016

Related U.S. Application Data (63) Continuation-in-part of application No. 12/397,641, filed on Mar. 4, 2009, now abandoned.

(60) Provisional application No. 61/036,615, filed on Mar. 14, 2008.

(51) Int. Cl.
 A01K 29/00 (2006.01)
 A01K 11/00 (2006.01)

(52) U.S. Cl.
 CPC .................................... *A01K 15/026* (2013.01)

(58) Field of Classification Search
 CPC ............................ A01K 15/026; A01K 15/025
 USPC ......... 119/707, 709–711; 220/811–813, 820; 446/75
 See application file for complete search history.

(56) References Cited

U.S. PATENT DOCUMENTS

| | | | |
|---|---|---|---|
| 2,959,354 A | 11/1960 | Beck | |
| 3,526,351 A * | 9/1970 | Goldstein | B65D 5/725 220/820 |
| 3,865,300 A * | 2/1975 | Caveney | B65D 5/727 229/124 |
| D256,958 S | 9/1980 | Markham | |
| 5,203,469 A * | 4/1993 | Chang | B25H 3/003 206/372 |
| 5,832,877 A | 11/1998 | Markham | |
| 5,947,061 A | 9/1999 | Markham et al. | |
| 5,957,082 A | 9/1999 | Budman et al. | |
| 6,098,571 A | 8/2000 | Axelrod et al. | |
| 6,526,912 B1 | 3/2003 | Ottoson | |
| 6,546,896 B1 | 4/2003 | Markham | |
| 6,941,895 B2 | 9/2005 | St. Pierre | |
| 7,140,511 B2 * | 11/2006 | Baker | B65D 43/20 206/701 |
| RE39,563 E | 4/2007 | Markham | |
| 7,246,574 B2 | 7/2007 | Renforth | |
| 7,278,374 B2 | 10/2007 | Mann | |
| 7,426,903 B2 * | 9/2008 | Simon | A01K 15/025 119/702 |
| 7,600,488 B2 | 10/2009 | Mann | |
| 7,900,583 B2 * | 3/2011 | Simon | A01K 15/025 119/702 |
| 2001/0047770 A1 | 12/2001 | Pontes | |
| 2004/0056035 A1 * | 3/2004 | Baker | B65D 43/20 220/345.1 |
| 2005/0092763 A1 * | 5/2005 | Haggerty | B65D 83/0864 220/812 |
| 2007/0022971 A1 | 2/2007 | Renforth et al. | |
| 2007/0261644 A1 * | 11/2007 | Simon | A01K 15/025 119/707 |
| 2009/0000565 A1 | 1/2009 | Bryce | |

(Continued)

FOREIGN PATENT DOCUMENTS

WO    WO2009078788 A1    6/2009

*Primary Examiner* — Kristen C Hayes
(74) *Attorney, Agent, or Firm* — Law Office of J. J. Simunic; Joan Simunic (57) ABSTRACT

A toy for a pet comprising a housing with at least one rotatable component and at least one cavity for accommodating a treat for a pet is disclosed. In order to access the treat, the pet must rotate the housing member to the open position.

18 Claims, 10 Drawing Sheets

(56) References Cited

U.S. PATENT DOCUMENTS

| | | | |
|---|---|---|---|
| 2009/0133639 A1 | 5/2009 | Ottosson | |
| 2009/0191316 A1* | 7/2009 | Perry | A23G 3/563 |
| | | | 426/115 |
| 2010/0078437 A1* | 4/2010 | Valley, III | B65D 25/107 |
| | | | 220/507 |
| 2014/0224185 A1* | 8/2014 | Hansen | A01K 15/025 |
| | | | 119/710 |

* cited by examiner

PET TOY WITH HIDDEN TREAT CAVITY

CROSS-REFERENCE TO PRIOR APPLICATIONS

The present application claims priority to U.S. Patent Application 61/036,615 filed 2008 Mar. 14, and U.S. patent application Ser. No. 12/397,641 filed 2009 Mar. 4, currently pending, which are both incorporated by reference in their entireties.

FIELD OF THE INVENTION

The present development is a toy for a pet comprising a housing comprising at least one rotatable member, wherein the toy has at least one hidden cavity for accommodating a treat. The toy preferably includes a means for enhancing the degree of difficulty in gaining access to the cavity

BACKGROUND OF THE INVENTION

Household pets enjoy playing with toys. Most toys are designed to allow the pet to chew on the toy, or to provide entertainment while batting the toy around.

As pets spend more time confined in relatively small spaces, such as within houses or residential yards, their need for intellectual stimulation increases. However, few toys are designed to be intellectually challenging for the pet.

The present development addresses this issue by providing a pet toy design that challenges the pet to determine how to access a treat hidden within the toy housing.

SUMMARY OF THE PRESENT INVENTION

The present development is a toy for a pet comprising a housing with at least one rotatable component and at least one cavity for accommodating a treat for a pet. The rotatable member comprises a portion of the housing, so when the housing is "opened" an internal cavity is exposed. The cavity can be filled with a treat, and then the housing "closed" so the cavity and treat are no longer visible. In order to access the treat, the pet must rotate the housing member to the open position.

DETAILED DESCRIPTION OF THE PRESENT DEVELOPMENT

The following description is intended to provide the reader with a better understanding of the invention. The description is not intended to be limiting with respect to any element not otherwise limited within the claims.

As shown in FIGS. 1A-5B, the present development is a toy 10 for a pet comprising at least one cavity-containing member 12 and at least one rotatable component 14 and at least one cavity for accommodating a treat for a pet 16. When the rotatable member is "opened" an internal cavity is exposed. The cavity can be filled with a treat, and then the housing "closed" so the cavity and treat are no longer visible. As the pet plays with the toy the pet senses the presence of the hidden treat and exerts itself in trying to reach the treat, eventually figuring out how to move the rotating member enough to expose the cavity and gain access to the treat. The treat preferably is a type of food, such as a dog biscuit, or peanut butter, or some other product that would attract the pet's interest.

An exemplary embodiment is shown in FIGS. 1A-5B. As shown in FIGS. 1A-2B, the cavity-containing member 12 and the rotatable member 14 are designed to engage so as to form the body of the toy 10 with a head 10H and a foot 10F, wherein the rotatable member 14 can move relative to the cavity-containing member 12. In a preferred embodiment, the toy 10 has a shape that is attractive to a pet, such as the shape of a dog bone.

As shown in FIGS. 2B-5B, the cavity-containing member 12 and the rotatable member 14 are complementary segments held together by a connecting member 18 fixedly attached to the rotatable member 14. When the toy 10 is fully assembled and in the "closed" position, an internal horizontal surface $C_I$ of the cavity-containing member 12 abuts an internal horizontal surface $R_I$ of the rotatable member 14 and an internal vertical surface $C_V$ of the cavity-containing member 12 abuts an internal vertical surface $R_V$ of the rotatable member 14 at a juncture 20, and a cavity-containing member external surface $C_F$ and a rotatable member external surface $R_F$ are exposed. In a preferred embodiment, the rotatable member 14 can rotate 360° relative to the cavity-containing member 12.

Figure 1A:
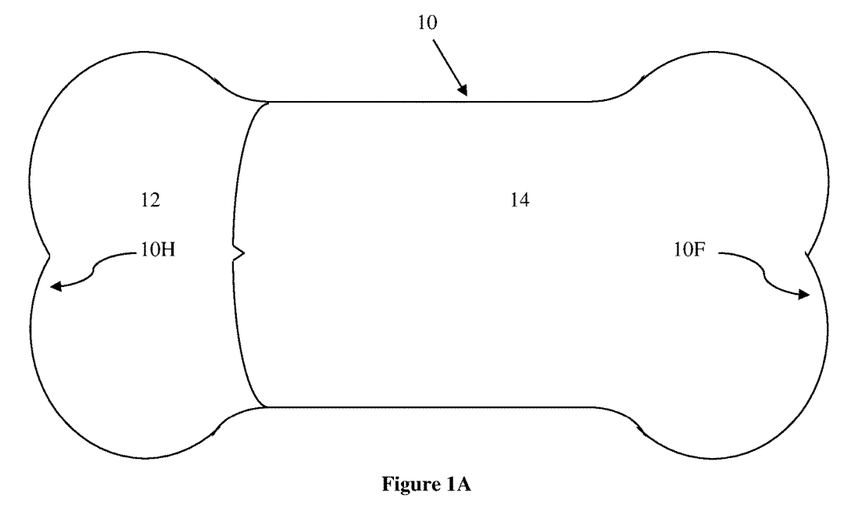
FIG. 1A is a top view of a fully-assembled first embodiment of a toy made according to the present invention with the rotatable member turned to hide the cavity.
Figure 1B:
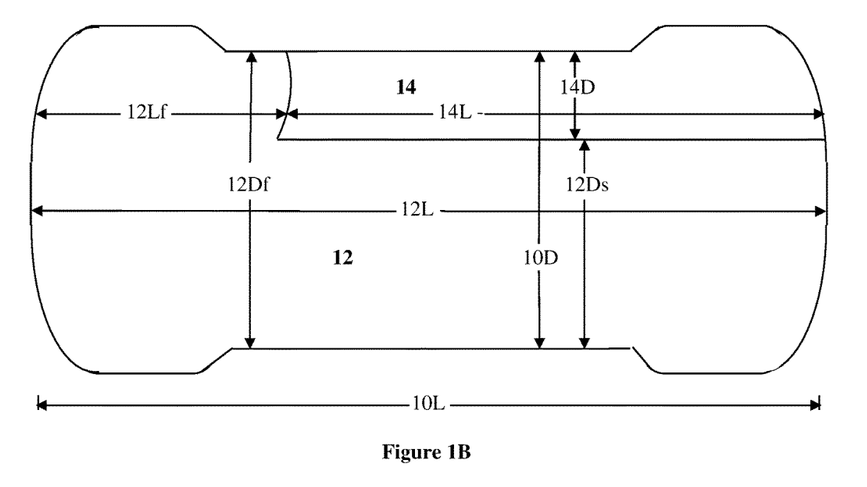
FIG. 1B is a side view of the toy of FIG. 1A with the rotatable member turned to hide the cavity.
Figure 2A:
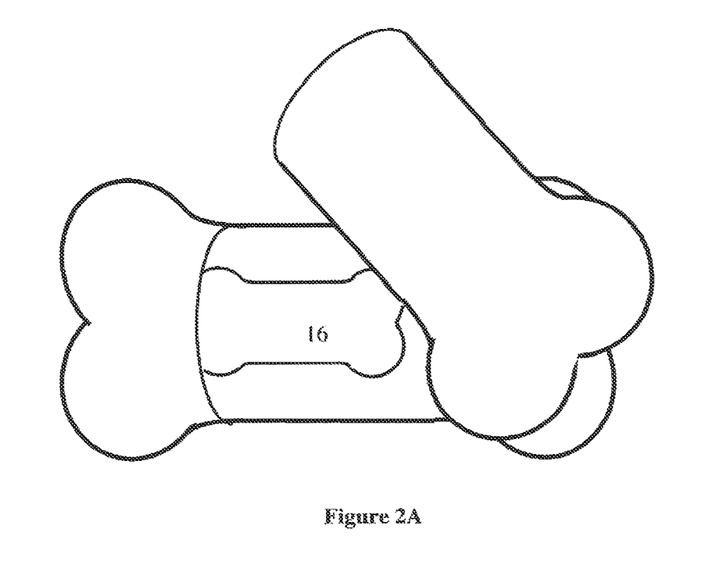
FIG. 2A is a top view of the toy of FIG. 1A with the rotatable member partially turned to expose the cavity.
Figure 2B:
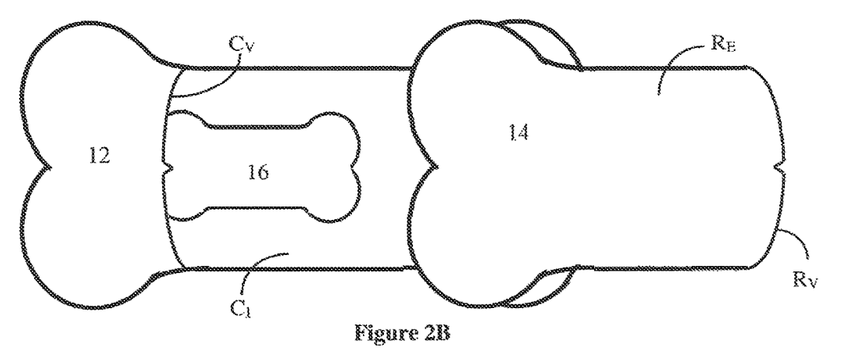
FIG. 2B is a top view of the toy of FIG. 1A with the rotatable member turned to fully expose the cavity.
Figure 3:
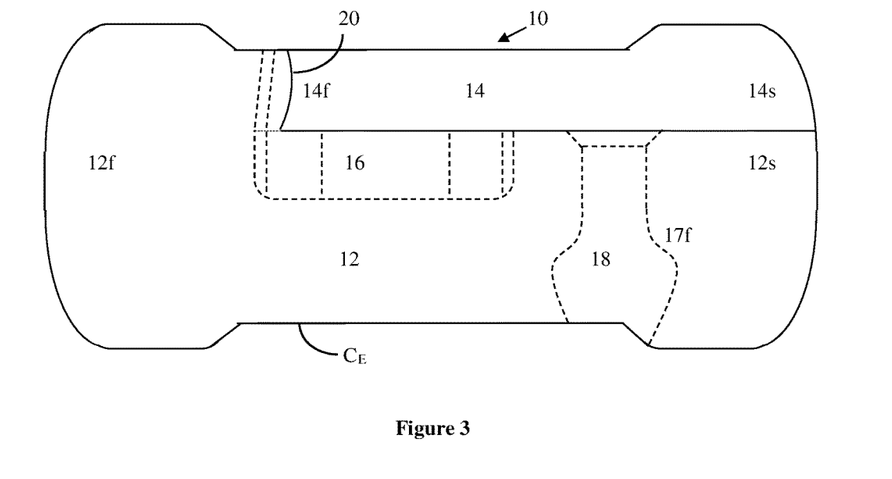
FIG. 3 is a side view of the toy of FIG. 1A with the rotatable member turned to hide the cavity and with the internal components shown in phantom.

Referring to FIG. 1B, the fully assembled toy 10 defines a length 10L and a depth 10D. The cavity-containing member 12 defines a total length 12L, a first-end length 12Lf, a first-end depth 12Df, and a second-end depth 12Ds. In a preferred embodiment, the length 12L of the cavity-containing member 12 is equal to the length of the fully assembled toy 10L. The rotatable member 14 is designed to complement the cavity-containing member 12 to complete the fully assembled toy 10, and defines a length 14L and a depth 14D. In a preferred embodiment, the first-end length 12Lf of the cavity-containing member 12 plus the length of the rotatable member 14L is equal to the length of the fully assembled toy 10L, and the second-end depth 12Ds of the cavity-containing member 12 plus the depth of the rotatable member 14D is equal to the depth of the fully assembled toy 10D.

Returning to the cavity-containing member 12, and referring to FIGS. 1A-4, the cavity-containing member 12 defines a first end 12f and a second end 12s. The first end 12f, located at the head of the toy 10H, comprises up to approximately one-third of the total length 12L. It is recommended, but not required, that the length of the first end be long enough to allow a pet to engage the first end 12f with a paw to hold the toy 10 steady enough to allow the pet to interact with the rotatable member 14. The first end 12f has a depth 12Df equal to or greater than the depth 10D of the fully assembled toy 10 at the juncture 20. Optionally, the depth of the first end may vary moving from the juncture 20 across the first end, such that part of the first end 12f may have a depth greater than the toy depth 10D or lesser than the toy depth 10D or some combination thereof.

Figure 4:
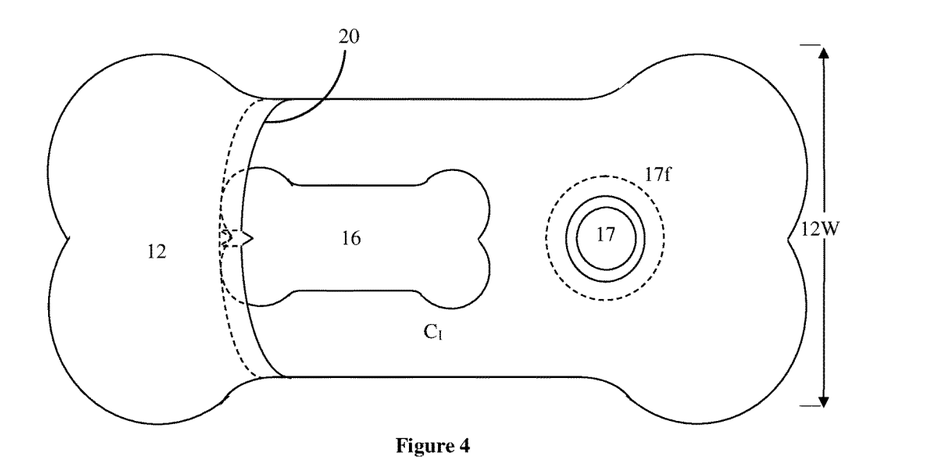
FIG. 4 is the top view of the cavity member of the toy of FIG. 1A.
Figure 5A:
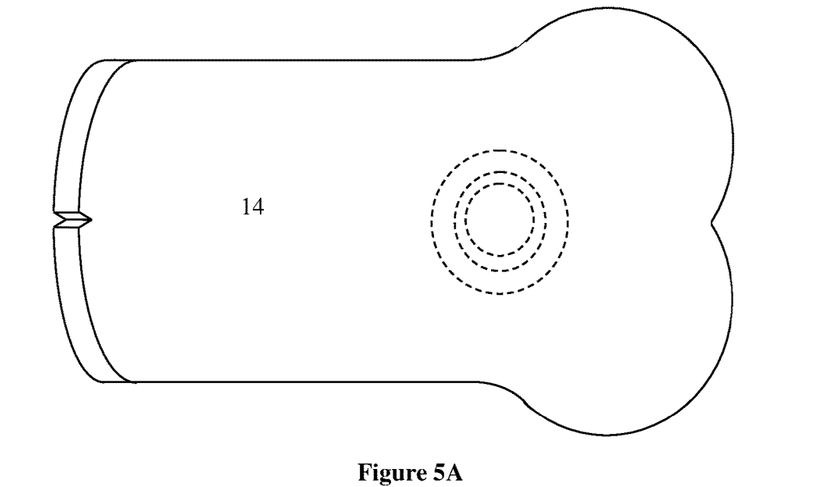
FIG. 5A is a top view of the rotating member of the toy of FIG. 1A.
Figure 5B:
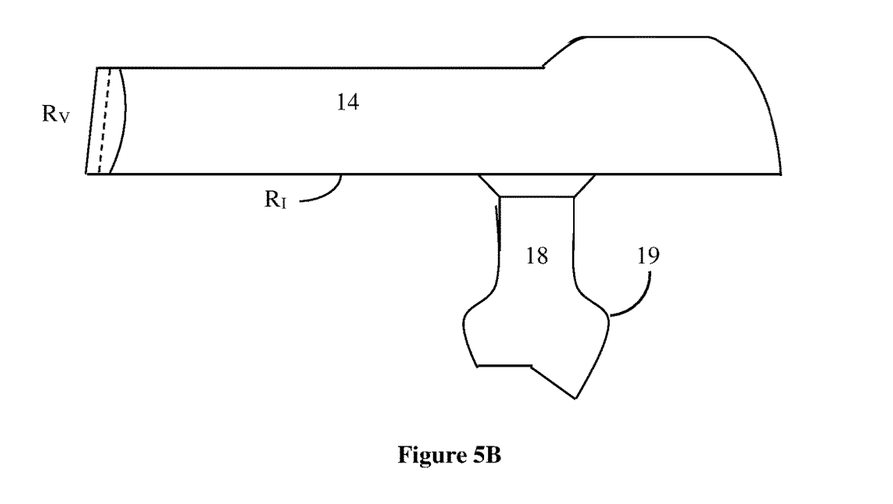
FIG. 5B is a side view of the rotating member of the toy of FIG. 1A.
Figure 6A:
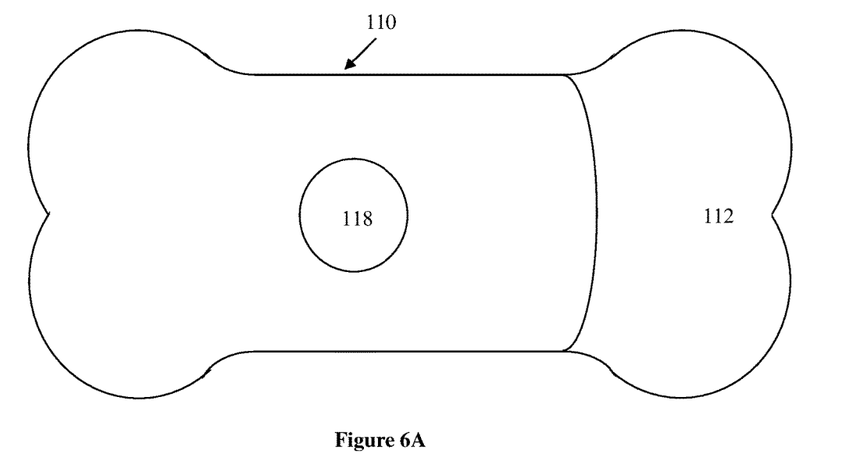
FIG. 6A is a top view of a fully-assembled second embodiment of a toy made according to the present invention with the rotatable member turned to hide the cavity.
Figure 6B:
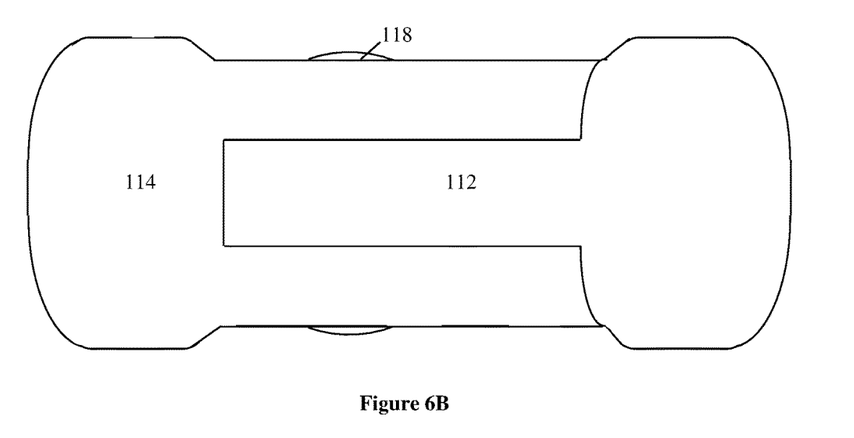
FIG. 6B is a side view of the toy of FIG. 1A with the rotatable member turned to hide the cavity.
Figure 7:
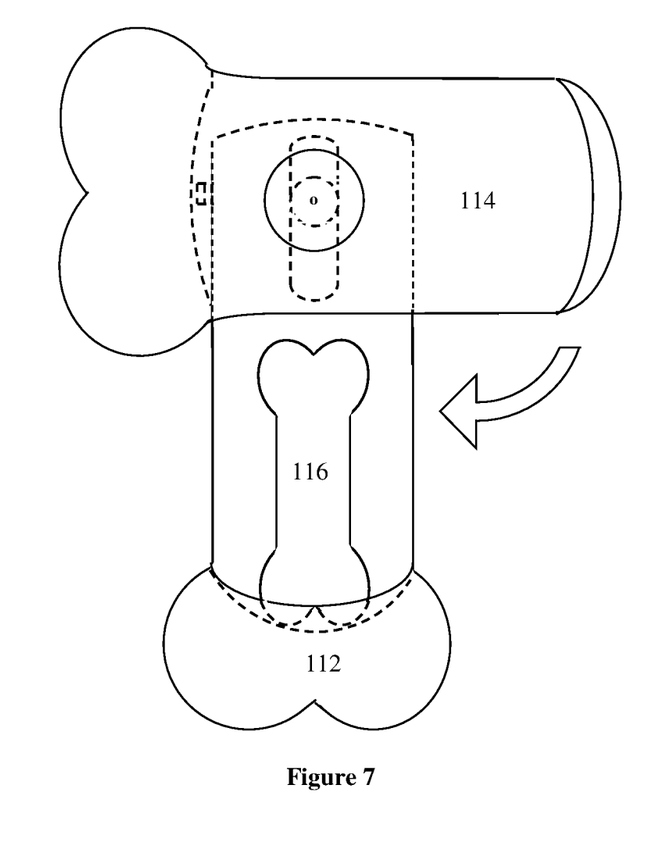
FIG. 7 is a top view of the toy of FIG. 6A with the rotatable member turned to fully expose the cavity.

The second end 12s extends away from the first end 12f toward the foot of the toy 10F, and includes the internal horizontal surface $C_I$ of the cavity-containing member 12. A keyhole 17 configured to accept and retain the connecting member 18 is positioned near the foot 10F. The keyhole 17 may be a circular aperture, or a slot, or any other design that allows the connecting member 18 to be accepted into and retained within the keyhole 17. In a preferred embodiment, the keyhole 17 is within the one-third length of the cavity-containing member 12L that is closest to the foot 10F. In a preferred embodiment, the keyhole extends vertically from the internal horizontal surface $C_I$ through the entire body of the cavity-containing member 12. Any means to retain the connecting member 18 within the keyhole 17 may be used. In a preferred embodiment, the connecting member 18 has shoulders 19 that engage with a flared region 17f within the keyhole to retain the connecting member 18 once it has been inserted.

The cavity 16 is formed by a depressed region in the interior face $C_I$, and is located between the juncture 20 and the keyhole 17. The cavity 16 may be any shape or size provided it can accommodate a treat, such as a dog biscuit or peanut butter.

Referring now to the rotatable member 14 as shown in FIGS. 1A-3 and 5A-5B, the rotatable member 14 is designed to complement the cavity-containing member 12 to produce the toy 10. The connecting member 18 is fixedly attached to the internal horizontal surface $R_I$ of the rotatable member 14 and extends vertically downward from the horizontal surface $R_I$. The connecting member's 18 position on the rotatable member 14 is determined by the position of the keyhole 17 in the cavity-containing member 12—the connecting member 18 must be aligned with the keyhole 17 such that when the rotatable member 14 is secured to the cavity-containing member 12, the connecting member 18 is inserted into the keyhole 17, the shoulders of the connecting member 18 are restrained by the flared region 17s of the keyhole, the internal vertical surface $C_V$ of the cavity-containing member 12 abuts the internal vertical surface $R_V$ of the rotatable member 14 at the juncture 20, and the internal horizontal surface $C_I$ of the cavity-containing member 12 abuts the internal horizontal surface $R_I$ of the rotatable member 14. When fully assembled, the rotatable member 14 should be securely held to the cavity-containing member 12, but the rotatable member 14 should be able to freely rotate relative to the cavity-containing member 12. In a preferred embodiment, the rotatable member 14 should be able to freely rotate 360° relative to the cavity-containing member 12.

The toy 10 may have any shape or configuration that can provide for the cavity-containing member 12 and the rotatable member 14. A preferred embodiment has the shape of a dog bone, but the toy 10 may have the shape of a cylinder, rectangle, pyramid, ribbon, animal, among other shapes.

In a first alternative embodiment, the juncture 20 of the toy may adapted to increase the challenge for the pet to open the toy 10. For example, the rotatable member 14 and the cavity-containing member may have complementary slightly curved faces on their vertical surfaces $C_V$, $R_V$ as shown in FIGS. 1A-5B, or they may have complementary wedge and recess shapes that align (not shown), or they may include a "V" latch and recess that can gently secure the rotatable member 14 so it remains closed until the pet takes an action to force the toy 10 to open.

Preferably, the present development is made from a material such as plastic resin, rubber, a synthetic material, or a combination thereof. The material may include various colors and textures as known in the art for pet toys.

Optionally, the toy of the present development may include indentations to allow for the pet to grip the toy in its teeth. A further optional feature is the inclusion of grooves or ridges on the exterior surface of the housing that will allow the pet to stabilize the toy with its paws.

Figure 8:
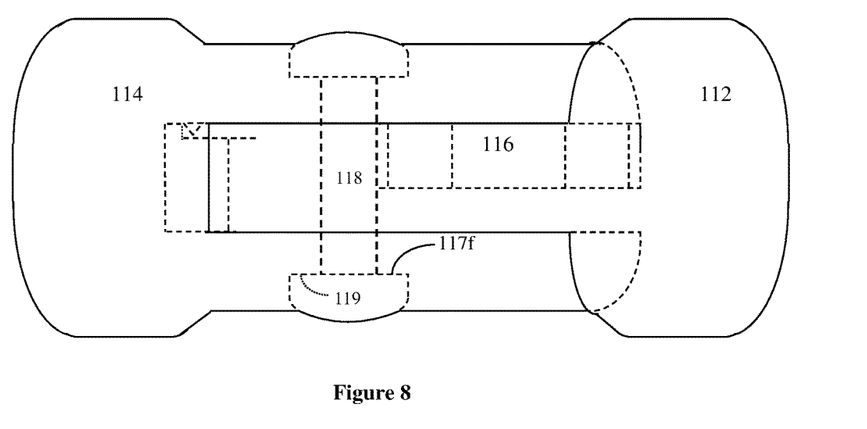
FIG. 8 is a side view of the toy of FIG. 6A with the rotatable member turned to hide the cavity and with the internal components shown in phantom.
Figure 9A:
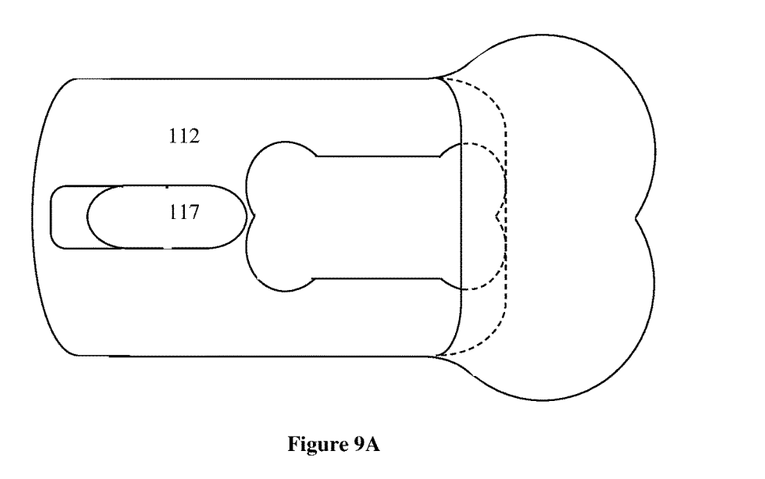
FIG. 9A is the top view of the cavity member of the toy of FIG. 6A.
Figure 9B:
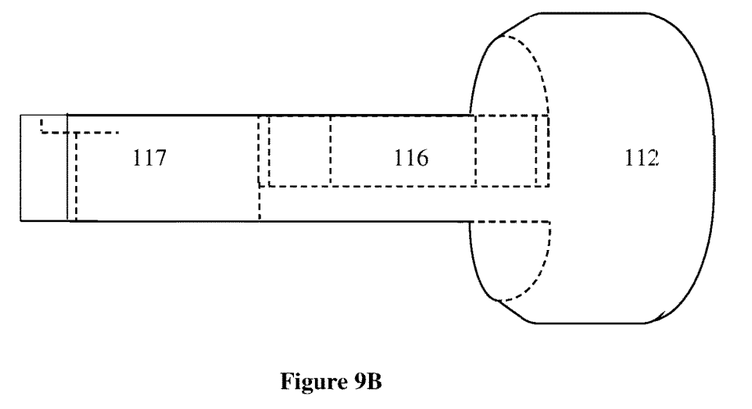
FIG. 9B is the side view of the cavity member of the toy of FIG. 6A.
Figure 10A:
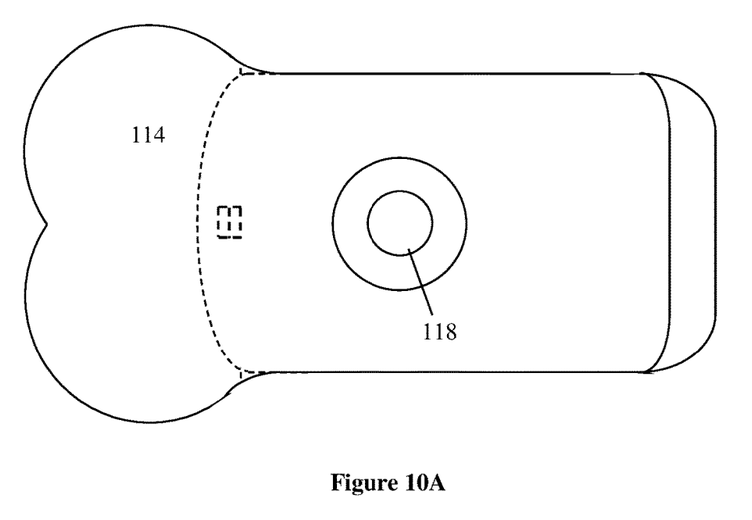
FIG. 10A is the top view of the rotatable member of the toy of FIG. 6A.
Figure 10B:
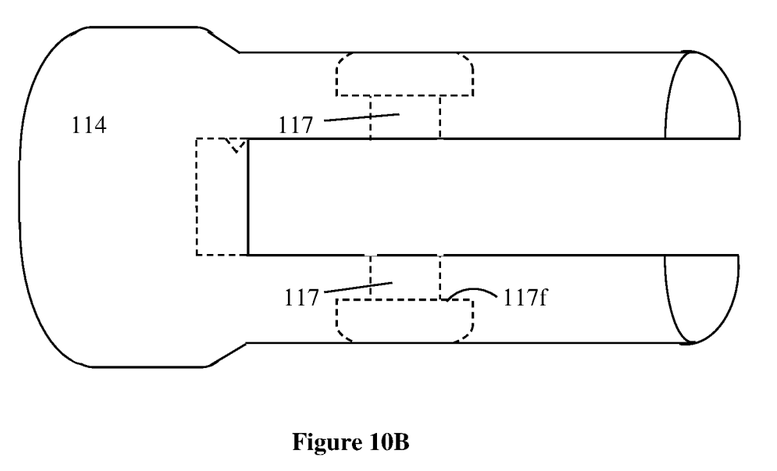
FIG. 10B is the side view of the rotatable member of the toy of FIG. 6A.
Figure 10C:
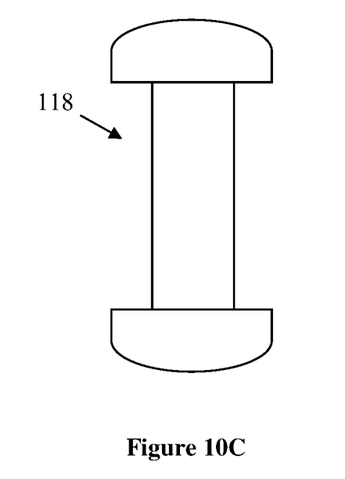
FIG. 10C is the side view of the connecting member that secures the cavity member to the rotatable member of the toy of FIG. 6A.
Figure 11A:
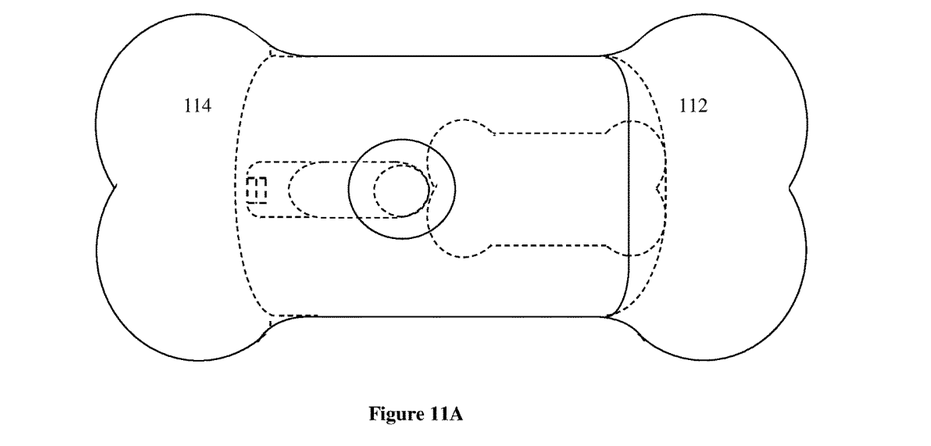
FIG. 11A is a top view of the toy of FIG. 6A with the rotatable member turned to hide the cavity and with the internal components shown in phantom.
Figure 11B:
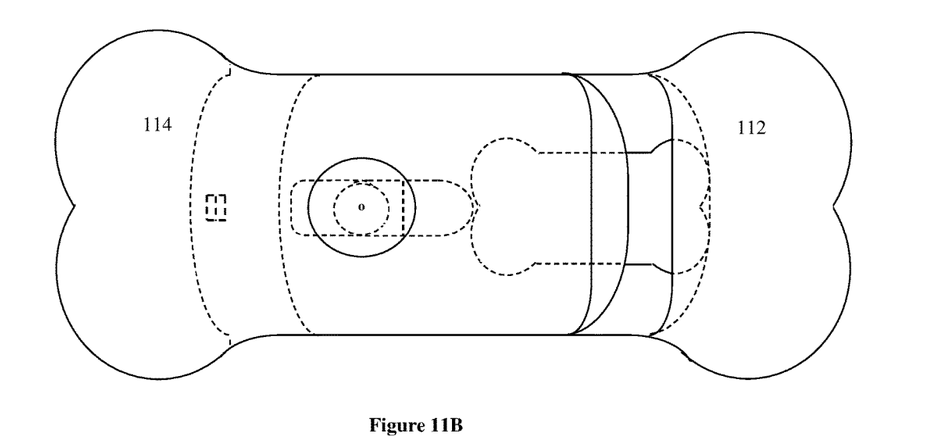
FIG. 11B is a top view of the toy of FIG. 6A with the rotatable member turned to hide the cavity and slidably displaced as an intermediate step in exposing the cavity, and with the internal components shown in phantom.

A second alternative embodiment 110 is shown in FIGS. 6A-11B. As with the pet toy 10, the pet toy 110 comprises a cavity-containing member 112 with a cavity 116 on an internal surface and a rotatable member 114 wherein the rotatable member 114 is retained to abut the cavity-containing member 112 by a connecting member 118 having a shoulder 119 projecting through a keyhole 117 having a flared region 117f on the cavity-containing member 112. Particularly as shown in FIGS. 6B and 8, the rotatable member 118 may be designed to "sandwich" the foot portion of the cavity-containing member 112.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Thus, for example, reference to "a section" includes a plurality of such sections, and so forth.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

It is anticipated that the pet toy described herein may be used for other purposes. For example, the toy is not limited to use with household pets but may be placed outdoors to stymie curious wildlife, such as squirrels or raccoons.

Any specific dimensions relevant to the pet toy described herein are provided for the purpose of demonstrating the invention, but these dimensions are not intended to limit the scope of the invention. It is understood that one skilled in the art may make alterations to the embodiments shown and described herein without departing from the scope of the invention.

What is claimed is:

1. A pet toy comprising:
   (1) at least one cavity-containing member defining a body and a first horizontal internal surface, wherein the first horizontal internal surface has a cavity configured to hold a pet treat and a keyhole that extends essentially vertically from the first horizontal internal surface through the entire body of the cavity-containing member; and,
   (2) at least one rotatable member defining a second horizontal internal surface, wherein the rotatable member has a connecting member fixedly attached to the second horizontal internal surface and wherein the connecting member is positioned such that when the connecting member is inserted into the keyhole in the cavity-containing member the connecting member is retained within the keyhole and the rotatable member can move relative to the cavity-containing member; and,
wherein the rotatable member is positioned relative to the cavity-containing member such that the first horizontal internal surface abuts the second horizontal internal surface when the pet toy is in a closed position, and wherein the cavity-containing member and the rotatable member are shaped to be complementary to each other.

2. The pet toy of claim 1 wherein the keyhole is a circular aperture.

3. The pet toy of claim 1 wherein the keyhole is a slot.

4. The pet toy of claim 1 wherein the rotatable member is able to freely rotate 360° relative to the cavity-containing member.

5. The pet toy of claim 1 further including a means to secure the rotatable member relative to the cavity-containing member so that the rotatable member remains closed until the pet takes an action to force the toy to open.

6. The pet toy of claim 5 wherein the securing means are complementary curved faces on the rotatable member and on the cavity-containing member.

7. The pet toy of claim 5 wherein the securing means are a complementary wedge and recess on the rotatable member and on the cavity-containing member.

8. The pet toy of claim 1 wherein the cavity-containing member and the rotatable member and the connecting member are made from plastic resin, rubber, synthetic material, or a combination thereof.

9. The pet toy of claim 1 further including indentations to allow for the pet to grip the toy in its teeth.

10. The pet toy of claim 1 further including grooves or ridges on the exterior surface of the housing.

11. The pet toy of claim 1 wherein the toy has a shape of a dog bone.

12. A pet toy consisting essentially of a cavity-containing member having a first horizontal internal surface and a complementary rotatable member having a second horizontal internal surface, wherein the cavity-containing member has a cavity on the first horizontal internal surface and a keyhole projecting from the first horizontal internal surface essentially vertically through the cavity-containing member, and wherein the rotatable member has a connecting member fixedly attached to the rotatable member second horizontal internal surface, and wherein the connecting member is positioned on the rotatable member such that the connecting member can be inserted into the keyhole in the cavity-containing member so as to allow the rotatable member to move relative to the cavity-containing member.

13. The pet toy of claim 12 wherein the keyhole is a circular aperture.

14. The pet toy of claim 12 wherein the keyhole is a slot.

15. The pet toy of claim 12 wherein the rotatable member is able to freely rotate 360° relative to the cavity-containing member.

16. The pet toy of claim 12 further including a means to secure the rotatable member relative to the cavity-containing member so that the rotatable member remains closed until the pet takes an action to force the toy to open.

17. The pet toy of claim 12 further including indentations to allow for the pet to grip the toy in its teeth.

18. The pet toy of claim 12 further including grooves or ridges on the exterior surface of the housing.

* * * * *